United States Patent [19]
Cimminelli et al.

[11] Patent Number: 5,924,438
[45] Date of Patent: Jul. 20, 1999

[54] GAS-PRESSURE RELIEF VALVE UNIT, PARTICULARLY FOR FUEL VAPORS

[75] Inventors: Francesco Cimminelli, Torino; Osvaldo Lobascio, Venaria Reale; Giulio Castagneri, Nole, all of Italy

[73] Assignee: Ergom Materie Plastiche S.p.A., Borgano Torinese, Italy

[21] Appl. No.: 09/006,837

[22] Filed: Jan. 14, 1998

[30] Foreign Application Priority Data

Jan. 14, 1997 [IT] Italy .................................. TO97A0022

[51] Int. Cl.⁶ .................................................. F16K 17/36
[52] U.S. Cl. .......................... 137/39; 137/43; 137/513.3
[58] Field of Search ................................ 137/39, 43, 44, 137/513.3, 513.5, 513.7, 624.2; 220/516, 518

[56] References Cited

U.S. PATENT DOCUMENTS

| | | | |
|---|---|---|---|
| 2,860,656 | 11/1958 | Eshbaugh . | |
| 3,036,594 | 5/1962 | Salisbury . | |
| 3,756,273 | 9/1973 | Hengesbach . | |
| 4,646,772 | 3/1987 | Bergsma | 137/43 X |
| 4,760,858 | 8/1988 | Szalaga | 137/43 |
| 5,004,002 | 4/1991 | Kobayashi . | |
| 5,028,244 | 7/1991 | Szlaga . | |
| 5,065,782 | 11/1991 | Szlaga | 137/39 |
| 5,156,178 | 10/1992 | Harris | 137/43 |
| 5,261,439 | 11/1993 | Harris | 137/43 |
| 5,449,018 | 9/1995 | Harris | 137/43 X |

FOREIGN PATENT DOCUMENTS

| | | |
|---|---|---|
| 2686048 | 7/1993 | France . |
| TO92U0198 U | of 1992 | Italy . |

Primary Examiner—Stephen M. Hepperle
Assistant Examiner—John Bastianelli
Attorney, Agent, or Firm—Sughrue, Mion, Zinn Macpeak & Seas, PLLC

[57] ABSTRACT

A gas-pressure relief valve unit, particularly for fuel vapours, comprising a body defining a chamber which communicates with first and second environments upstream and downstream of the unit respectively, through first and second apertures. The body is provided with a first and a second assemblies, the first assembly including a valve seat interposed between the apertures and an obturator urged by a resilient thrust element and movable between a position of engagement with the seat and a position spaced from it. The obturator can move away from the valve seat, overcoming the action of the resilient element, when a predetermined threshold value of the pressure differential between the environments is reached. When the obturator is engaged with the seat and the pressure differential between the environments is less than the predetermined threshold value, the valve means define a narrow passage which allows a small, continuous flow of gas between the first and second environments.

9 Claims, 1 Drawing Sheet

GAS-PRESSURE RELIEF VALVE UNIT, PARTICULARLY FOR FUEL VAPORS

BACKGROUND OF THE INVENTION

The present invention relates to a gas-pressure relief valve unit, particularly for fuel vapour, comprising a body having means adapted to allow its connection in correspondence of an opening of a top wall of a fuel tank, the body defining a chamber adapted to communicate with first and second environments, upstream and downstream of the unit respectively, through first and second apertures, first and second valve means being associated with the body, the first valve means being associated with the chamber and including a first valve seat and an obturator movable between a position of engagement with said first seat, in which the first valve means cut off at least part of a vapour flow between the apertures, and a position spaced from the first seat, the obturator being urged by a resilient thrust element towards its position of engagement with the first seat, whereby it can be moved away from the first valve seat, against the action of the resilient element, when a predetermined threshold value of the pressure differential between the environments is reached, in the position in which the obturator is engaged with the first seat and when the pressure differential between the environments is less than the predeterminated threshold value, the first valve means define a narrow passage with respect to said first and second apertures such as to allow a small, continuous flow of gas between the first and second environments, the second valve means comprising a second valve seat.

A valve unit of the type defined above is known, for example, from Italian Patent Application No. TO92U000198. This known unit, intended for application to a wall of a vehicle fuel tank, includes a pressure relief valve complex constituted by two one-way flow valves operating in opposite directions.

More particularly, a first valve, having an annular seat and a metal disc obturator urged towards its seat by a spring enables the interior of the tank to be put in communication with the exterior when the pressure within the tank exceeds a predetermined value.

The second valve, constituted by a disc of elastomeric material supported by the disc obturator itself and having a central hole from which projects a pair of separable lips which normally mate together, enables the external environment to be put in communication with the interior of the tank when the pressure in the tank falls below a predetermined value relative to the external pressure.

The production of such a valve complex is however relatively complicated and thus expensive. It is in fact necessary to provide two valves and then to assemble several elements together in a restricted space. In addition, these elements are usually of different materials from each other, such as metal and elastomer, which are in turn different from the material forming the body of the unit. More particularly, the fact that one of the one-way flow valves includes at least one elastomeric element, as is preferred to ensure the desired flexibility and elasticity of the pair of separable lips, may be critical with regard to the reliability of operation of the entire unit. It is in fact known that elastomers age in the presence of hydrocarbons and lose their properties of flexibility and elasticity in time.

This known unit is also rather noisy, in use, as each of the one-way flow valves is subject to a continuous cycle of opening and closing. Indeed, each of these valves opens only when the pressure differential between the gases in the environments upstream and downstream exceeds a predetermined threshold. As a result, each one-way flow valve, at least in the instants immediately after its opening, experiences a relatively high rate of flow of gas due to the flow of the quantity of gas which has previously accumulated under pressure in the respective environment upstream or downstream. In particular, the obturator knocks against the seat of the first one-way flow valve, which normally works in a condition of unstable equilibrium, assuming its open and closed configurations in succession at a high frequency. The second valve, the maximum opening of which is limited by the fact that it is disposed radially within the first valve, also operates by allowing successive quantities of gas through as these reach a pressure sufficient to open it and, since the gas usually passes through at a relatively high velocity, this may cause whistling noises as a result of the vibrations in the separable lips.

A valve unit of the type defined above is also known from document U.S. Pat. 5,028,244.

SUMMARY OF THE INVENTION

The obturator of the valve unit of the invention has a simpler structure than that of the prior art. More particularly, it may be manufactured without the second one-way flow valve, that is, that intended to open when the pressure differential between the environments downstream and upstream the unit exceeds a predetermined threshold. As it has only a single one-way flow valve, the obturator of the unit may be made in one piece and in such a way as not to require various parts to be assembled, all of which provides the whole with the advantage of reducing the cost of the valve unit and increasing its reliability in use. Moreover, as the unit of the invention allows a small, regular flow of gas through it, the entire system in which the unit is located is not subject to cyclic fatigue stress, with successive expansions and contractions, as occurred previously since a predetermined pressure threshold does not normally have to be reached for the gas to pass through the unit. Thus the entire system is benefited, having to withstand smaller stresses overall.

When a unit according to the invention is applied to a fuel-supply system for a vehicle, it is also possible to reduce the escape of vapour to the exterior of the system to advantage, this occurring to a small but not negligible extent through its walls, connectors and seals, even though the system as a whole is not subjected to overpressure, in practice. When the obturator is engaged with its valve seat, the gas flow through the unit is generally small and constant, being due mainly to variations in the fuel temperature and variations in the level of the fuel in the tank as a result of consumption thereof during running of the engine. Only when the pressure differential between the environments upstream and downstream of the valve unit is sufficiently large is the resilient biasing force of the spring overcome so as to open the valve means of the unit and enable a significantly greater flow to pass through than that which flows through the narrow passage under normal operating conditions.

As a result of the fact that the unit of the invention is intended to work with relatively small flows, it may be made with smaller dimensions than known units. When such a valve unit is to be connected to an active carbon trap, or carbon canister, the dimensions of the trap may also be reduced as the trap also works with a smaller, almost constant vapour flow instead of with substantial quantities of gas which have accumulated in the system.

BRIEF DESCRIPTION OF THE DRAWINGS

Further characteristics and advantages of the invention will become more apparent from the detailed description which follows, given with reference to the appended drawings, provided purely by way of non-limitative example, in which.

DETAILED DESCRIPTION OF THE INVENTION

Figure 1:
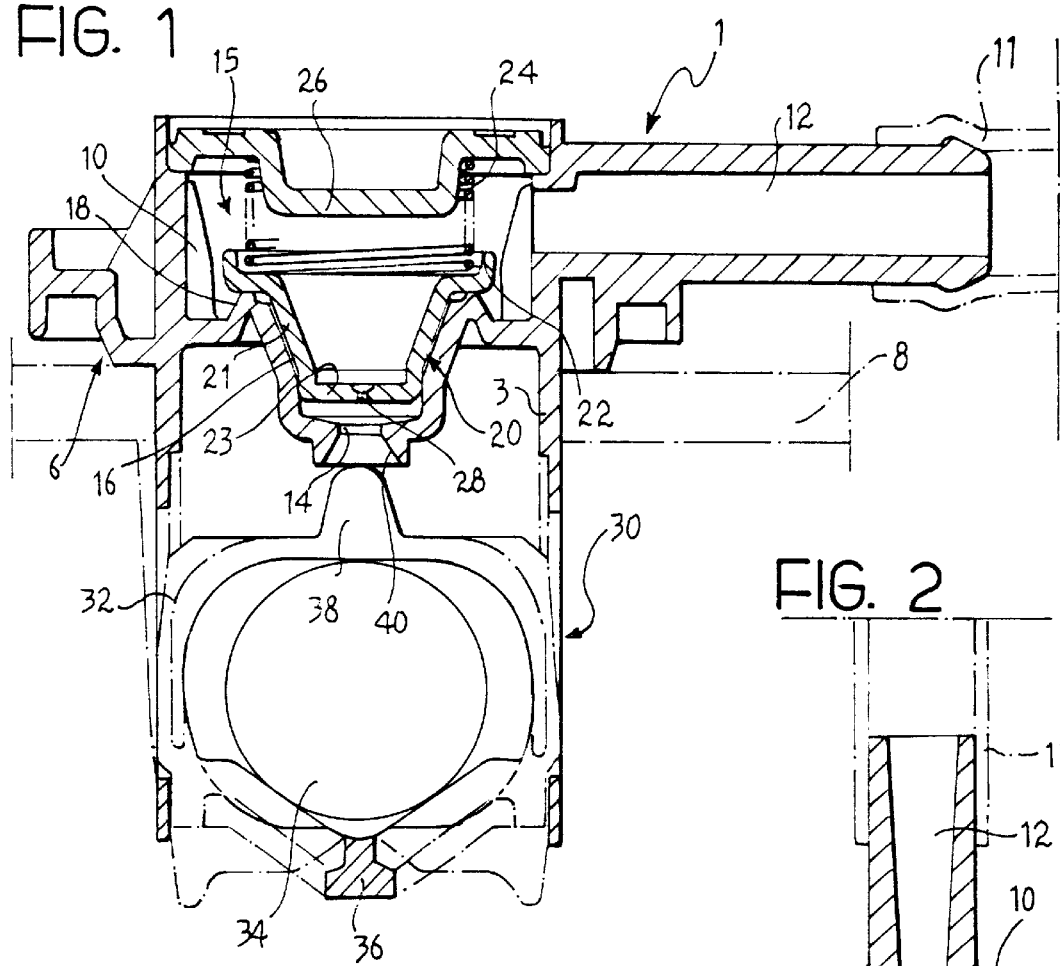
FIG. 1 is a sectioned elevational view of the valve unit of the invention.

With reference initially to FIG. 1, a valve unit is generally indicated 1.

The unit 1 comprises a generally cylindrical body 3 defining an internal chamber 10. The body 3 is conveniently made by moulding from plastics material and, as is frequently the case, when it is to be associated with a fuel-supply system for a vehicle, it is preferably made from a plastics material which is inert to hydrocarbons, for example an acetal resin.

The body 3 may be associated with the vehicle's fuel-supply system by insertion through a hole formed in the top 8 of the fuel tank until an annular flange 6 thereof abuts the edge of this hole, or by connection to the tank filler pipe, for example in correspondence with an expansion vessel of this pipe.

The chamber 10 in the body 3 communicates through a lower aperture 14 with a first environment upstream of the unit 1, for example a fuel tank, and through another aperture 12 with a second environment downstream of this unit, for example a tube for connecting the tank to a carbon canister. The aperture 12 may be bounded by a tubular connector element with an auxiliary tube 11 made integrally with the body 3.

The chamber 10 houses valve means, indicated 15, which include a valve seat 18 defined by an annular rib coaxial with the body 3 and a movable obturator 20 which can cooperate with the seat 18. The obturator 20 is conveniently made as a single part from the same material as that constituting the body 3. Suitably it has a cup shape with a substantially conical peripheral wall 21 terminating at one end in a base 23 and at the opposite end in a collar 22.

A helical spring 24 is associated with the obturator 20 so as to urge it into contact with the seat 18. More particularly, a first end of the spring 24 bears against a circular seat in the collar 22 of the obturator 20 while its opposite end bears against a surface of the body 3 facing into the chamber 10, for example a surface of an upper cover 26 of the body 3. Alternatively, that end of the spring 24 which co-operates with the obturator 20 may be located in an alternative circular seat defined by its base 23.

The obturator 20, which is normally urged into engagement with the seat 18, can take up a position spaced therefrom in which the valve means 15 are open, against the action of the spring 24, if the pressure differential between the environments upstream and downstream of the valve unit 1 is greater than a predetermined threshold. This threshold value is, naturally, a function of the resilient characteristic of the spring 24.

A conical appendage 16 integral with the body 3 projects from the seat 18 into the chamber 10 in the opposite direction from the obturator 20, the shape of the appendage corresponding to the peripheral wall of the obturator 20.

Thus, during the travel of the obturator 20 towards the seat 18, its peripheral wall is guided by the conical surface of the appendage 16 so as to ensure that the obturator 20 engages the seat 18 correctly.

In the closed position of the valve means 15, that is, when the obturator 20 engages the seat 18 as the pressure differential between the environments is below the threshold value required to overcome the force of the spring 24, the valve means define a narrow, calibrated passage for the flow of gases between the environments upstream and downstream of the unit 1. Thus a small, continuous gas flow is normally allowed between the first and second environments through the valve means 15 but the dimensions of the narrow passage are such that a bubble of air is, in any event, maintained upstream of the obturator 20 during refilling with fuel.

Preferably this narrow passage is made by forming a calibrated through-hole 28 in the base 23 of the obturator 20, for example, coaxial therewith. The dimensions of the hole 28, in particular its diameter, may be calculated according to the capacity of a tank located upstream of the unit 1. For example, for a tank with an approximately 50 litre capacity, this hole should have a diameter of the order of 0.8 mm.

The obturator 20 may thus be made in one piece and from the same material as the body 3, for example from a plastics material inert to hydrocarbons, such as an acetal resin. Thus it is very simple to manufacture and does not involve the use of elastomeric parts.

If required, the body 3 may also house other types of valve so that the valve unit 1 may constitute a so-called multi-functional valve. In the embodiment illustrated in FIG. 1, the body 3 includes a roll-over safety valve 30 of known type including a cage structure 32 slidable within the body 3 so as to surround a metal ball 34 movable on a conical member 36 fixed to the body 3. A conical pin obturator 38 projects from the cage 32 and co-operates with a seat 40 formed in the aperture 14. Naturally, the unit 1 may include a float valve of known type, either instead of or as well as the roll-over safety valve 30.

Figure 2:
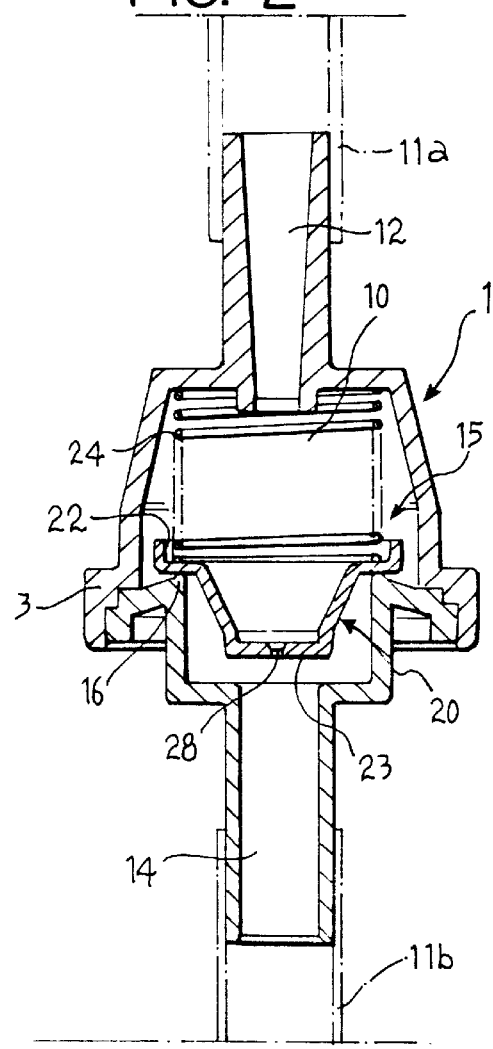
FIG. 2 is a view similar to FIG. 1 showing a variant of the unit of the invention.

In a variant of the invention illustrated in FIG. 2, where elements the same as, or similar to, those of FIG. 1 are indicated by the same reference numerals, a valve unit 1 may be manufactured so as to be insertible in a pipe 11a, 11b of a gas vent line, for example for vapours from a vehicle fuel tank. In this case the body 3 may be made as a pair of snap-engageable shell parts, each of which has an integral tubular connector element and is adapted to define a respective aperture 12, 14 for connection to the chamber 10 of the body

What is claimed is:

1. A gas-pressure relief valve unit, particularly for fuel vapour, comprising a body having means adapted to allow its connection in an opening of a top wall of a fuel tank, the body defining a chamber adapted to communicate with first and second environments, upstream and downstream of the unit respectively, through first and second apertures, first and second valve means being associated with the body, the first valve means being associated with the chamber and including a first valve seat and an obturator movable between a position of engagement with said first seat, in which the first valve means cut off at least part of a vapour flow between the apertures, and a position spaced from the first seat, the obturator being urged by a resilient thrust element towards its position of engagement with the first seat, whereby it can be moved away from the first valve seat, against the action of the resilient element, when a predetermined threshold value of the pressure differential between the environments is reached, in the position in which the obturator is engaged with the first seat and when the pressure differential between the environments is less than the predetermined threshold value, the first valve means define a narrow passage with respect to said first and second apertures such as to allow a small, continuous flow of gas between the first and second environments, the second valve means comprising a roll-over safety valve having a second valve seat, wherein the first and second valve seats are formed of integral one piece construction with the body with the first valve seat defining a wide passage with respect to said first and second apertures wherein the first and second valve means are both independent from fuel level inside the fuel tank.

2. A unit according to claim 1, wherein the resilient thrust element bears against a surface of the body interposed between said chamber and external environment.

3. A unit according to claim 1, wherein the narrow passage comprises a calibrated hole which passes through the obturator so as to put the first and second environments into communication.

4. A unit according to claim 1, wherein the obturator is made in one piece and from the same material as the body of the unit.

5. A unit according to claim 1, wherein the obturator is generally cup-shaped and has a substantially conical portion which can engage a correspondingly shaped surface formed in the body close to the valve seat, whereby this substantially conical portion and the corresponding surface of the body serve to guide the obturator into correct engagement with its seat.

6. A unit according to claim 1, wherein the obturator has a circular seat for receiving one end of a helical thrust spring, the other end of the spring bearing against a surface of the body facing into the chamber.

7. A unit according to claim 6, wherein the circular seat is provided in the base of the obturator.

8. A unit according to claim 1, wherein it is intended for connection to a fuel inlet pipe of a vehicle fuel tank in correspondence with an expansion vessel of this pipe.

9. A unit according to claim 1, wherein it is intended to be interposed in a duct in a vent line for the vapour from a vehicle fuel tank.

* * * * *